United States Patent
Boevenbrink et al.

(10) Patent No.: US 7,132,485 B2
(45) Date of Patent: Nov. 7, 2006

(54) DOSING OF PEROXIDE TO A SUSPENSION PROCESS WHEREIN STYRENE IS POLYMERIZED

(75) Inventors: Hendrikus Gerardus Boevenbrink, Twello (NL); Frans Johannes Hoogesteger, Nijmegen (NL)

(73) Assignee: Akzo Nobel N.V., Arnhem (NL)

(*) Notice: Subject to any disclaimer, the term of this patent is extended or adjusted under 35 U.S.C. 154(b) by 0 days.

(21) Appl. No.: 10/552,437

(22) PCT Filed: Apr. 2, 2004

(86) PCT No.: PCT/EP2004/003661

§ 371 (c)(1), (2), (4) Date: Nov. 1, 2005

(87) PCT Pub. No.: WO2004/089999

PCT Pub. Date: Oct. 21, 2004

(65) Prior Publication Data

US 2006/0111529 A1    May 25, 2006

Related U.S. Application Data

(60) Provisional application No. 60/471,963, filed on May 20, 2003, provisional application No. 60/530,222, filed on Dec. 17, 2003.

(30) Foreign Application Priority Data

Apr. 14, 2003    (EP) .................................. 03076088

(51) Int. Cl.
*C08F 12/08* (2006.01)
*C08F 4/34* (2006.01)

(52) U.S. Cl. .................. 526/86; 526/81; 526/219.6; 526/230.5; 526/232.1; 526/232.5; 525/260; 525/263; 525/265; 525/316; 521/56; 521/146

(58) Field of Classification Search .................. 526/81, 526/86, 346, 219.6, 230.5, 232.1, 232.5; 521/56, 146; 525/260, 263, 265, 316
See application file for complete search history.

(56) References Cited

U.S. PATENT DOCUMENTS

| | | | |
|---|---|---|---|
| 3,451,985 A | 6/1969 | Mahlo | |
| 4,363,881 A | 12/1982 | Smith | |
| 4,731,388 A | 3/1988 | Matsui et al. | |
| 5,189,069 A | 2/1993 | Speikamp et al. | |
| 5,905,096 A | 5/1999 | Lay et al. | |
| 6,153,658 A | 11/2000 | Paleja et al. | |
| 2003/0187135 A1 | 10/2003 | Kuhn et al. | |

FOREIGN PATENT DOCUMENTS

| | | |
|---|---|---|
| DE | 199 11 960 A1 | 9/2000 |
| EP | 0 234 705 A2 | 9/1987 |
| EP | 0 390 000 A2 | 10/1990 |
| EP | 0 488 025 A2 | 6/1992 |
| EP | 0 492 712 A1 | 7/1992 |
| GB | 1086591 | 10/1967 |
| WO | WO 00/17245 | 3/2000 |
| WO | WO 02/14393 A1 | 2/2002 |

*Primary Examiner*—Fred Teskin
(74) *Attorney, Agent, or Firm*—Oliff & Berridge, PLC

(57) ABSTRACT

The invention relates to a suspension polymerization process for the preparation of styrene-containing (co)polymers, wherein the process comprises the steps of continuously or semi-continuously dosing an initiator to the reaction mixture, said initiator having a specified half-life at the temperature of the reaction mixture to which it is dosed. The invention further relates to styrene based (co)polymer obtainable by said process, and to the use of said styrene (co)polymer in a shaping process.

25 Claims, No Drawings

DOSING OF PEROXIDE TO A SUSPENSION PROCESS WHEREIN STYRENE IS POLYMERIZED

This application claims the benefit of European Patent Application No. 03076088.8 filed Apr. 14, 2003, U.S. Provisional Patent Application No. 60/471,963 filed May 20, 2003 and U.S. Provisional Patent Application No. 60/530,222 filed Dec. 17, 2003. The entire disclosure of the prior applications are hereby incorporated by reference herein their entirety.

The invention relates to an essentially vinyl chloride-free batch process for polymerizing, in a suspension, styrene monomer, or a mixture of monomers comprising styrene, for the preparation of styrene-containing (co)polymers, wherein the process comprises the step of continuously or semi-continuously dosing an initiator to the polymerization mixture at the polymerization temperature. The invention further relates to styrene based (co)polymer obtainable by said process, and to the use of said styrene (co)polymer in a shaping process.

Processes for polymerizing styrene monomers are known in the art, for instance from U.S. Pat. No. 4,363,881 and U.S. Pat. No. 6,153,658. Here a conventional process is described wherein peroxide is added at two points in a batch suspension process, but wherein the peroxide is not dosed. U.S. Pat. No. 5,189,069 suggests to dose an initiator dissolved in monomer to obtain styrene beads with a controlled particle size. Conventional initiators are used that have a half-life of more than one hour at the dosing temperature. Comparable processes are disclosed in EP-A-0 234 705 and in EP-A-0 488 025, wherein use is made of a different method, i.e. seeding the reaction mixture with substantial amounts of polymer seed particles before the continuous addition of an initiator solution in monomer(s) is started. Also in EP-A-0 234 705 the initiators that are dosed have a half-life of more than one hour at the dosing temperature. Another process to prepare a suspension of polystyrene is described in U.S. Pat. No. 5,905,096. Here a prepolymer comprising peroxide and blowing agent is formed, which is subsequently suspended and reacted to completion. All these methods are aimed at particle size control, but they suffer from the disadvantage that pre-determining the molecular weight of the polymer and controlling the rate of polymerization is difficult, if not impossible. In addition, these methods require a long polymerization time and typically comprise more than one reaction step, and often the initiator is to be added as a solution in monomer, which can show undesired (pre) polymerization before it is added to the reactor and, therefore, may not be safe.

It is an objective of the invention to provide a method of polymerizing styrene monomer for the preparation of a styrene-based (co)polymer, also referred to in the this description as "polystyrene", with good control of the molecular weight and the molecular weight distribution, so that a polymer is obtained which is comparable to the polymer of the conventional process, but requiring a shorter polymerization time. In the process at least one initiator is used that is wholly or partially dosed while fulfilling the requirements of the present invention. More specifically, the at least one initiator being dosed is to be chosen such that, given the specific polymerization temperature profile, the half-life requirements are met. This initiator is called "the initiator" in the remainder of the application. The invention also encompasses a process wherein a combination of initiators is dosed, as long as the combination of intiators comprises "the initiator". It is noted that the term "the initiator" from this point on encompasses such combination of initiators. Also it is noted that "the initiator" can be used in combination with an additional initiator. In that case the latter may be dosed separately or just added, without being dosed.

In the process of the invention the molecular weight and the molecular weight distribution of the polystyrene in a polymerization process of styrene monomer can be controlled, while the overall space-time-yield of the polymerization equipment is increased.

It is noted that this process does not require the use of a pre-polymerization process or the addition of seed particles. However, if so desired, polymer particles, especially particles of an undesired particle size resulting from earlier polymerization batches, may be recycled. If used, the particles are preferably dissolved in the monomer for more than 50% during the heating of the reaction mixture to the polymerization temperature.

It is further noted that WO 00/17245 discloses a process wherein vinyl chloride can be copolymerized with styrene in a suspension process wherein peroxide is dosed. The present process differs from the process of WO 00/17245 in that it is essentially vinyl chloride-free, meaning that the amount of vinyl chloride is less than 1% by weight, preferably less than 0.1% by weight, based on the weight of all monomer. Preferably, the process of the present process is completely free of vinyl chloride, to avoid pressure build-up in the process and to avoid environmental issues. As is known in the art, the polymerization kinetics of a vinyl chloride polymerization differ strongly from the kinetics of other ethylenically unsaturated monomers because the chain transfer to monomer reaction is prevalent in vinyl chloride-containing polymerization processes. This results in the major difference that the molecular weight of the vinyl chloride polymer is largely determined by the polymerization temperature, whereas this is not the case when a styrene polymer is formed.

During the process of dosing the initiator a polymerized product will be formed. Thus, after a certain period of time the initiator is dosed to a mixture of monomer and polymerized product. Preferably, the initiator is continuously or semi-continuously dosed over a period of at least 0.5, more preferably at least 1 hour. When larger quantities of polymer are made in a batchwise fashion, an addition time of up to 5 hours or more is possible, depending on the molecular weight required. From a commercial and a technical point of view, continuous dosing of the initiator is preferred over semi-continuous dosing.

Preferably, the dosing of the initiator to the polymerization mixture is semi-continuous or continuous over a period of time wherein at least 20%, preferably at least 40%, more preferably at least 70% of the monomers are polymerized. If a semi-continuous operation is selected, there are many (preferably 4 or more) moments at the polymerization temperature at which small portions of the initiator are dosed. If so desired, the semi-continuous and the continuous operation can be combined, such that the initiator is dosed a number of times over certain (longer or shorter) periods of time.

Most preferably, the initiator is dosed continuously or semi-continuously from the point in time at which at least 1%, preferably at least 0.5%, more preferably at least 0.1%, most preferably none of the monomer has already been polymerized until at least 70%, preferably at least 80%, more preferably at least 90%, and most preferably essentially all of the monomer is polymerized. "Essentially all is polymerized" means that less than 1000 ppm of monomer is present in the final polymerized product.

The term "continuous" also includes continuous addition at variable rates and variable time intervals. The addition of initiator at variable rates is beneficial for using the cooling capacity of the polymerization reaction in the most optimal way and to prevent a so-called "run away" during the polymerization reaction. The term "semi-continuous" means an addition method wherein a number of portions of initiator are added to the polymerization mixture. If many portions are added at short intervals, the continuous addition method is being approached.

In one embodiment, the process according to the invention involves the polymerization of styrene-comprising monomer mixtures, further comprising co-monomers. In this embodiment it is preferred that the styrene-comprising monomer mixture comprises at least 50% by weight (wt. %) of styrene, based on the weight of all monomer. Co-monomers that can be used are of the conventional type and are preferably selected from the group consisting of vinyl acetate, ethylene, propylene, acrylonitrile, butadiene, and (meth)acrylates and which includes ethylenically unsaturated polymers, such as polybutadiene and styrene butadiene rubber. Although it is less preferred, also vinylidene chloride can be copolymerized. More preferably, at least 80 wt. % of the monomers being polymerized is styrene, whereas the most preferred process is a process wherein essentially all monomer is styrene.

In the process according to the invention, the half-life requirement for the initiator is such that said initiator, when present in the reaction mixture at the polymerization temperature, decomposes for 50% or more (on a molar basis) in 60 minutes or less. Preferably, the half-life is less than 50 minutes, more preferably less than 40 minutes, even more preferably less than 30 minutes and most preferably less than 15 minutes in the reaction mixture at the polymerization temperature. At the same time, the half-life preferably is more than 0.5 minutes, more preferably more than 1 minute, even more preferably more than 2.5 minutes, and most preferably more than 5 minutes in the reaction mixture at the polymerization temperature. The minimum half-life is 0.5 minutes or more, otherwise the initiator is not effective. It is believed that said inefficiency at a shorter half-life is due to the fact that the initiator should have time to migrate through the reaction mixture to the polymer/monomer phase, which is discontinuous, before it decomposes. Because redox-initiating systems typically give an almost instantaneous formation of radicals, also such initiating systems are less preferred.

It was surprising to find that a conventional styrene suspension polymerization process could be improved by using a combination of dosing techniques and selecting the proper initiator. Just using a conventional peroxide and making it decompose faster by raising the polymerization temperature resulted in a polymer with a reduced average molecular weight. Just dosing a conventional peroxide resulted in a slower, not faster, polymerization time. However, combining the two measures, meaning that the peroxide decomposed faster and that is was dosed, resulted in a product with an average molecular weight similar to that of the conventional product and in a shortened polymerization time.

Preferably, the polymerization temperature is at most 170° C. Preferably, the reaction temperature is 150° C. or lower, more preferably 130° C. or lower.

The half-life of all initiators used can be determined by conventional thermal decomposition studies in monochlorobenzene, as is known in the art (see for instance the brochure "Initiators for high polymers" with code 10737 obtainable from Akzo Nobel).

By using one or more additional initiators, it was found that the same or lower residual level of monomers can be achieved compared to a conventional process that differs in that the initiators are not dosed and optimized in the dosing process. Hence, it is preferred to not only dose the initiator but to also use one or more additional initiators. If such additional initiators are used in the process, the half-life of each of them preferably is less than 120 minutes, more preferably less than 60 minutes, even more preferably less than 30 minutes, and most preferably less than 10 minutes, and preferably more than 0.05 minutes, more preferably more than 0.5 minutes, even more preferably more than 2.5 minutes, and most preferably more than 5 minutes, in the reaction mixture at the polymerization temperature. The one or more other initiators are added to the polymerization mixture at once or they are dosed to the polymerization mixture.

Preferably, essentially all of the initiators that are dosed fulfill the half-life requirement. Even more preferably, essentially all initiators used in the process fulfill the half-life requirement.

It is noted that the word initiator is used here in the classical sense to denominate those compounds that generate free radicals, which, in turn, initiate the polymerization reaction. Hence, when certain thermally labile compounds are used for the purpose of (wholly or partially) surviving the polymerization conditions, e.g. such that they are present in the final polymer as a flame retardant synergist, the part that does not decompose is not to be seen as an initiator in accordance with the present invention.

Examples of suitable classes of initiators that can be dosed and fulfill the half-life requirement for the initiator (depending on the actual polymerization temperature) are peroxydicarbonates, peroxycarbonates, peroxyesters, peroxyketals, diacylperoxides, dialkylperoxides, azo-initiators, ketone peroxides, and mixtures thereof.

These initiators may have one or more peroxy and/or azo moieties per molecule. Optionally, these initiators are further functionalized with one or more functional groups, such as amine, phosphate, ester, ether and/or alcohol groups. The greatest reduction in polymerization time, while still rendering a polymer with a conventional molecular weight, was found for products selected from peroxides with a dibenzoylperoxide moiety or a 1,1-di(tert-butylperoxy)cyclohexane moiety and azo-initiators.

Preferred compounds with a benzoylperoxide moiety, as well as their half-lives, are presented in Table 1.

TABLE 1

| Compound | Name | Half-life data | | | |
|---|---|---|---|---|---|
| | | T10 | T1 | A | $E_a$ |
| (structure) | Bis(2-chlorobenzoyl) peroxide | 66 | 81 | 5.68E + 19 | 159 |
| (structure) | Di(2,4-dichlorobenzoyl) peroxide | 55 | 73 | 4.02E + 14 | 121.5 |
| (structure) | Dibenzoyl peroxide | 71 | 91 | 6.94E + 13 | 122.35 |
| (structure) | Bis(4-chlorobenzoyl) peroxide | | | | |
| (structure) | Di(2-methylbenzoyl) peroxide | 61 | 79 | 3.80E + 14 | 123.4 |
| (structure) | Bis(3-methylbenzoyl) peroxide | | | | |
| (structure) | Di(4-methylbenzoyl) peroxide | 70 | 88 | 5.11E + 15 | 134.3 |

TABLE 1-continued

| Compound | Name | Half-life data | | | |
|---|---|---|---|---|---|
| | | T10 | T1 | A | $E_a$ |
| (structure) | Bis(4-tert-butylbenzoyl) peroxide | 72 | 90 | 5.49E + 14 | 128.4 |
| (structure) | Bis(2-acetoxybenzoyl) peroxide | | | | |
| (structure) | Bis(3-isopropenylbenzoyl) peroxide | | | | |
| (structure) | Diphthaloyl peroxide | | | | |
| (structure) | Bis(4-phenylazobenzoyl) peroxide | | | | |
| (structure) | Bis(1-naphthoyl) peroxide | 47 | 62 | 1.30E + 17 | 133.4 |

TABLE 1-continued

| Compound | Name | Half-life data | | | |
|---|---|---|---|---|---|
| | | T10 | T1 | A | E$_a$ |
| (structure) | Bis(2-isobutoxy-carbonylbenzoyl) peroxide | 75 | 88 | 7.14E + 21 | 176.9 |
| (structure) | 1,2,7,10-Tetraoxa-3,6,11,14-tetraoxo-4,5,12,13-dibenzo-cyclotetradecane | | | | |
| (structure) | Bis((2-cyclohexyl-oxycarbonyl)benzolyl) peroxide | 74 | 89 | 1.18E + 20 | 164.7 |
| (structure) | Bis(2-naphthoyl) peroxide | 75 | 92 | 2.90E + 17 | 147.8 |

In the table T10 is the temperature (in ° C.) at which the half-life of the compound is 10 hours, T1 is the temperature (in ° C.) at which the half-life of the compound is 1 hour, Ea is the activation energy in J/mole, and A is the Arrhenius frequency factor in s$^{-1}$. Using the conventional Arrhenius equation, the half-life at the polymerization temperature can be calculated.

More preferred are substituted, or unsubstituted, dibenzoylperoxides, 1,1-di(tert-butylperoxy)-3,3,5-trimethylcyclohexane, 2,2-di(tert-butylperoxy)butane, 1,1-di(tert-butylperoxy)cyclohexane, and azo initiators. Most preferred are dibenzoylperoxide, 1,1-di(tert-butylperoxy)-3,3,5-trimethylcyclohexane, 2,2'-azobis(isobutyronitrile), and 2,2'-azobis(2-methylbutyronitrile). Commercially available initiators are obtainable under trade names such as Trigonox® 99, Trigonox® SBP, Trigonox® EHP, Trigonox® 131, Trigonox® 141, Trigonox® 21S, and Perkadox® 16, Trigonox® 27, Trigonox® 22, Trigonox® 29, Trigonox® 25, Trigonox® 125, Trigonox® 121, Trigonox® 421, Trigonox® 425, Perkadox® AMBN, Perkadox® AIBN, Perkadox® L W-75, Perkadox® 12, and Laurox.

The additional initiators used in the present process differ from the initiator, but may be selected from the same group of compounds.

When the reaction mixture is formulated at or near the polymerization temperature, which is called the warm-start process, it is not required to add a certain amount of initiator before bringing the reaction mixture to the reaction temperature and dosing the remainder at the reaction temperature. However, also in this warm-start process it may be beneficial to at once add up to 10 wt. %, preferably up to 5 wt. % of an initiator, based on the combined weight of the monomers, to the reaction mixture prior to polymerization. The initiator can then be dosed continuously or semi-continuously at the reaction temperature. When this procedure is used, the first initiator is added as the last ingredient after the monomers, solvent, and possibly other components have been mixed. This procedure is particularly preferred if a certain amount of polymerization inhibitor (a radical trapping species) is present in the reaction mixture. If such radical scavenger is present, for instance because it is contained in the monomer as a constituent thereof (typically added as a stabilizer), the initially dosed initiator will react with said scavenger, thereby preventing a delayed start of the polymerization reaction.

Preferably, the type and the amount of additional initiator are selected such that the residual monomer content of the final polymerized product is less than 5,000 mg/kg of monomer, preferably less than 2,000 mg/kg of monomer, more preferably less than 1,000 mg/kg of monomer.

The total amount of initiator to be used in the process according to the invention is within the range conventionally used in polymerization processes. Typically, it is preferred to use at least 0.01 wt. %, more preferably at least 0.05 wt. %, and most preferably at least 0.1 wt. % of all initiators and preferably at most 5 wt. %, more preferably at most 3 wt. %, and most preferably at most 1 wt. % of all initiators, based on the weight of the monomers to be polymerized.

Dosing to the reactor is typically effected by dosing the initiator as such (neat), as a mixture or solution with one or more solvents, or as a dispersion. Suitable solvents are preferably selected from the group consisting of water, conventional organic solvents, monomers, blowing agents (such as pentane, isopentane, and the like), and mixtures thereof. Mixtures with monomer may not be preferred for safety or quality control reasons. Preferably dispersions of the initiator, more preferably aqueous dispersions, are used. Most preferably a suspension of the initiator in water is used, such as a 40 wt. % dibenzoylperoxide suspension in water. Said suspension can be obtained commercially from Akzo Nobel Polymer Chemicals under the trade name Perkadox® L W-40. When solvents such as alcohols are used, they can be removed during working up of the polymer after the process of polymerization. If used, advantageously solvents are used that do not adversely affect the thermal stability of the initiator dissolved therein, as can be verified by analyzing the half-life temperature (temperature at which the half-life is 1 h) of the initiator in said solvent. An example of a solvent that can be used with most initiators is isododecane. If a dispersion of the initiator is dosed, the dispersion can be a dispersion of the initiator as such or a dispersion of a solution of said initiator. Preferably, the dispersion is an aqueous dispersion. Preferably, dilute initiator solutions or dispersions are used that ensure rapid mixing of the initiator, and the polymerization mixture, which leads to a more efficient use of the initiator. Therefore, it is preferred to use mixtures, solutions, or dispersions of the initiator having an initiator concentration of at least 0.1, more preferably at least 0.5, and most preferably at least 2 wt. %, up to at most 60, more preferably at most 25 wt. %, and most preferably at most 15 wt. %.

The polymerization process is a suspension process wherein the reaction mixture is a dispersion of a monomer-containing phase in a medium comprising water. In these processes the usual additives may be used. For example, for suspensions in water, one or more of the usual additives such as a surfactant, a chain transfer agent, a protective colloid, an anti-fouling agent, a pH-buffer, flame retardants, flame retardant synergists, etc., may be present. Blowing agents can be added at the start of or during the polymerization process. Because of the presence of styrene monomer and blowing agents such processes are at least partially carried out in a pressurized reactor. The combined weight of the additives preferably is at most 20 wt. %, based on the combined weight of all monomers.

Because of the reduced polymerization time of the present process, it is preferred to add blowing agents, if used, at an earlier stage than in a conventional process. More preferably, part or all of the blowing agent is introduced to the reaction mixture when the degree of polymerization of the monomer is less than 80, preferably less than 60, and most preferably less than 50%. A suitable process was found to be one where the blowing agent was dosed or added within one hour of the start of the polymerization. The most preferred process according to the invention is a batchwise suspension polymerization process involving the use of a blowing agent, for making expandable polystyrene (EPS).

In addition to the fact that dosing of the initiator at variable rates is beneficial for using the cooling capacity of the polymerization reaction in the most optimal way, it was also found that varying the dosing speed of the initiator during the polymerization process is advantageous for obtaining an economical polymerization process and obtaining polymerized product with the desired molecular weight. By varying the dosing speed within one run, polymers with a polymodal molecular weight distribution can be made. For instance, a bimodal molecular weight distribution can be produced in the same run by using two periods with varying dosing speeds. Such a bimodal molecular weight distributed polymer mixture has a part with low-molecular weight that is useful for improving the expandability of polystyrene and a part with high-molecular weight that improves the mechanical properties of the polymer.

Furthermore, it was observed that a polymer with essentially the same molecular weight as from a conventional process can be produced in less time, the only differences being the controlled dosing of the initiator and optimizing of the initiators used in the dosing process.

After the polymerization, the resulting (co)polymer (or resin) is preferably treated as is usual in the art. Polymers so obtained can be submitted to the usual monomer reduction, drying and/or screening steps. These one or more steps can be followed by, for example, an expansion step. As in conventional EPS processes, the amount of residual monomer content in the polymer product can be reduced in the usual manner; preferably by including a second step in the process wherein the reaction temperature is higher than the temperature used in the first step wherein the initiator was dosed, typically approx. 110-170° C., preferably in the presence of one or more additional initiators with half-life temperatures as defined before, such as tert-butylperoxybenzoate, tert-butyl peroxy-2-ethylhexyl carbonate, dicumylperoxide, or tert-amyl peroxy-2-ethylhexyl carbonate. These additional initiators may be added at the start of or during the polymerization process. The resulting resin is characterized in that it preferably contains less than 50 ppm of residual initiator, more preferably less than 40 ppm, and most preferably less than 25 ppm of initiator, immediately after drying for 1 hour at 60° C. and screening.

The resulting resin is further characterized in that it preferably has a weight average molecular weight (Mw) of at least 100,000 g/mol, more preferably of at least 125,000 g/mol, and most preferably of at least 150,000 g/mol, and that it has a Mw preferably of at most 500,000 g/mol, more preferably of at most 450,000 g/mol, and most preferably of at most 350,000 g/mol, measured in accordance with conventional gel permeation chromatography techniques using polystyrene standards.

The invention further relates to styrene based (co)polymer obtainable by the aforementioned process and to the use of the styrene (co)polymer in a shaping process involving the heating of the co(polymer) for the preparation of foamed articles.

The invention is illustrated by the following non-limitative examples.

EXAMPLES 14 AND COMPARATIVE EXAMPLES A-D

General for Experiments 14 and A-D:
BPO, Px L (Perkadox® L W-75) Dibenzoyl peroxide (the initiator) ex Akzo Nobel after 190 min polymerization time at 110° C., in 30 minutes to 120° C. This temperature was maintained for 80 minutes. Then, the content of the reactor was cooled to room temperature.

The results are collected in the table below. It can be concluded that by dosing of the initiator (Examples 1-4), EPS with the same average molecular weight (Mw and Mn) and polydispersity can be obtained as in examples wherein the initiator is not dosed and the temperature is lower (Comp. Examples A-D). In dosing experiments where no pentane is used (Examples 34) also the same low residual styrene values are obtained as in non-dosing examples where no pentane is used (Comp. Examples C-D).

|  | Example | | | | | | | |
|---|---|---|---|---|---|---|---|---|
|  | 1 +pentane | 2 +pentane | 3 no pentane | 4 no pentane | A +pentane | B +pentane | C no pentane | D no pentane |
| Additional initiator | Tx-117 | Tx-131 | Tx-117 | Tx-131 | Tx-117 | Tx-131 | Tx-117 | Tx-131 |
| Mw product (×1000) g/mol | 221 | 191 | 265 | 260 | 243 | 195 | 275 | 251 |
| Mn product (×1000) g/mol | 79 | 72 | 85 | 84 | 85 | 78 | 101 | 87 |
| D (Mw/Mn) | 2.8 | 2.6 | 3.1 | 3.1 | 2.9 | 2.5 | 2.7 | 2.9 |
| Residual styrene (wt. %) | 1.76 | 4.14 | 0.17 | 0.28 | 0.75 | 0.66 | 0.31 | 0.19 |
| Polymerization time | 300 | 300 | 300 | 300 | 480 | 480 | 480 | 480 |
| Amount BPO (meq/100 g styrene) | 1.24 | 1.24 | 1.24 | 1.24 | 0.98 | 0.98 | 0.98 | 0.98 |
| Dosing time BPO (min) | 90 | 90 | 90 | 90 | 0 | 0 | 0 | 0 |
| Amount add. initiator (meq/100 g styrene) | 0.46 | 0.46 | 0.46 | 0.46 | 0.46 | 0.46 | 0.46 | 0.46 |
| Dosing time add. initiator (min) | 15 | 15 | 15 | 15 | 0 | 0 | 0 | 0 |
| Initial temperature (° C.) | 110 | 110 | 110 | 110 | 90 | 90 | 90 | 90 |
| Max. polymerization temperature (° C.) | 120 | 120 | 120 | 120 | 120 | 120 | 120 | 120 |

Tx-117 (Trigonox® 117) Tert-butylperoxy 2-ethylhexylcarbonate (additional initiator) ex Akzo Nobel
Tx-131 (Trigonox® 131) Tert-amylperoxy 2-ethylhexylcarbonate (additional initiator) ex Akzo Nobel A temperature-controlled 1-liter stainless steel Büchi reactor equipped with a baffle, a three-blade stirrer, a pressure transducer, (an) initiator dosing line(s), and a nitrogen purge was charged with 1.25 g of tricalcium phosphate. Then a solution of 230 g of water, 20 g of a 0.1 wt. % Nacconol® 90G (ex Stephan Chemie Co.) solution in water, and 10 g of a 0.5 wt. % Gohsenol® C. 500 (ex Nippon Gohsei) solution in water was added and stirred for approximately 5 min. To the reactor 220 g of styrene monomer were added. The reactor was evacuated several times to remove oxygen, a nitrogen blanket was applied, the reactor was closed, pressurized, and heated to the polymerization temperature in 45 minutes. For Comparative Examples A-D the polymerization temperature was 90° C. After 255 minutes at 90° C. the temperature was raised to 120° C. over a period of 60 minutes. This temperature was maintained for 120 minutes. Then, the whole was cooled to room temperature.

In Examples 1-4 the initiator was dosed, using a pressure pump, at a polymerization temperature of 110° C. In examples where no pentane was used, Perkadox® L W-75 was dosed in 90 minutes as a solution in 30 g styrene. The additional initiator was added as a solution in 5 g styrene after 190 minutes over a period of 15 minutes. In the examples where pentane was used, the BPO was added as a solution in styrene and pentane (30 g/15 g) and the additional initiator was added as a solution in 5 g pentane after 190 minutes of polymerization time over a period of 15 minutes. In all examples 14 the temperature was increased,

EXAMPLES 5-9 AND COMPARATIVE EXAMPLE E

Px-BC (Perkadox® BC-FF) Dicumyl peroxide ex Akzo Nobel

The procedure of the previous examples was repeated, except that 260 g of water was charged. In Examples 5, 8, and 9, additional initiator was added to the polymerization reaction at 180, 160, and 135 minutes after the start of the reaction, respectively. In Examples 6, 7, and E, the additional initiator was added at once prior to the start of the polymerization.

In examples 5 and 8 the temperature was increased after 190 min polymerization time at 110° C., in 15 minutes (example 5) or 30 minutes (example 8) to 120° C. This temperature was maintained for 50 minutes (example 5) or 80 minutes (example 8).

In example 7 the temperature was increased after 175 min polymerization time at 110° C., in 60 minutes to 130° C. This temperature was maintained for 100 minutes. In example 6 the temperature was increased after 155 min polymerization time at 110° C., in 30 minutes to 120° C. This temperature was maintained for 65 minutes, followed by an increase in temperature to 150° C. in 15 minutes at which this temperature was maintained for 95 minutes.

The results are collected in the table below. It can be concluded that the polystyrene obtained in a polymerization process according to the invention is comparable with respect to molecular weight and molecular weight distribution to polystyrene obtained in a conventional process, but the process of the invention requires a shorter polymerization time.

|  | (Comparative) Example | | | | | |
| --- | --- | --- | --- | --- | --- | --- |
|  | 5 | 6 | 7 | 8 | 9 | E |
| Initiator | Px-L W75 | Px-L W75 | Px-L W75 | Px-L W40 | PX-L W40 | Px-L W75 |
| Additional initiator | Tx-131 | Tx-117 | Px-BC | Tx-131 | Tx-131 | Tx-117 |
| Mw product (×1000) g/mol | 260 | 229 | 231 | 284 | 279 | 243 |
| Mn product (×1000) g/mol | 84 | 75 | 72 | 92 | 102 | 101 |
| D (Mw/Mn) | 3.1 | 3.1 | 3.2 | 3.1 | 2.8 | 2.7 |
| Residual styrene (wt. %) | 0.28 | 0.10 | 0.50 | 0.17 | 0.07 | 0.31 |
| Polymerization time | 300 | 370 | 325 | 300 | 300 | 480 |
| Amount BPO (meq/100 g styrene) | 1.24 | 0.83 | 1.53 | 1.24 | 0.98 | 0.98 |
| Dosing time BPO (min) | 90 | 90 | 90 | 75 | 80 | 0 |
| Amount add. initiator (meq/100 g styrene) | 0.46 | 0.87 | 0.46 | 0.46 | 0.46 | 0.46 |
| Dosing time add. initiator (min) | 15 | 0 | 0 | 5 | 5 | 0 |
| Initial temperature (° C.) | 110 | 110 | 110 | 110 | 110 | 90 |
| Max. polymerization temperature (° C.) | 120 | 150 | 130 | 120 | 120 | 120 |

EXAMPLES 10-11

Px L W40 (Perkadox®-L W40-TCP) Dibenzoyl Peroxide Suspension ex Akzo Nobel

The procedure of Example 5 was repeated, except that no additional initiator was used. In example 10 Px L W40 was used. The peroxide suspension was dosed as a diluted suspension (in 30 g water, the intake of water at the start of the reaction was corrected for this amount). Perkadox® L W-75 was used in example 11 and dosed as a solution in 30 g styrene. The styrene solution had to be temperature controlled in order to avoid polymerization of the solution itself.

The results were as follows:

|  | Example 10 | Example 11 |
| --- | --- | --- |
| Conversion (%) | 99.0 | 83 |
| Residual monomer (%) | 1.02 | 17 |
| Mw | 245000 | 185000 |
| Mn | 88000 | 70000 |
| Dispersity | 2.8 | 2.6 |

It can be concluded that the use of a suspension of BPO is preferred over the use of a solution of BPO in the process of the invention.

The invention claimed is:

1. An essentially vinyl chloride-free suspension polymerization process for polymerizing styrene monomer, or a mixture of monomers comprising styrene, comprising the step of continuously or semi-continuously dosing an initiator selected from the group consisting of peroxydicarbonates, peroxycarbonates, peroxyesters, peroxyketals, diacylperoxides, dialkylperoxides, azo-initiators, ketone peroxides, which initiators may be functionalized, and mixtures thereof, from the point in time at which none of the monomer has been polymerized until at least 70% of all the monomer is polymerized, to the reaction mixture at the polymerization temperature, wherein at least one initiator that is dosed has a half-life of 60 minutes or less at said polymerization temperature.

2. The process according to claim 1, wherein the mixture of monomers further comprises co-monomers selected from the group consisting of vinyl acetate, ethylene, propylene, acrylonitrile, butadiene, (meth)acrylates, and ethylenically unsaturated polymers.

3. The process according to claim 1, wherein said initiator is dosed continuously or semi-continuously from a point in time at which at least 0.1% of the monomer has already been polymerized until at least 70%.

4. The process according to claim 1, wherein the initiator is selected from the group consisting of substituted, or unsubstituted, dibenzoylperoxides, 1,1-di(tert-butylperoxy)-3,3,5-trimethylcyclohexane, 2,2-di(tert-butylperoxy)butane, 1,1-di(tert-butylperoxy)cyclohexane, azo initiators, and mixtures thereof.

5. The process according to claim 1, wherein the reaction temperature is 170° C. or lower.

6. The process according to claim 1, wherein at least part of the initiator is continuously or semi-continuously dosed over a period of at least 0.5 hour.

7. The process according to claim 1, wherein at least 0.01 wt.% of the combined weight of all initiators and at most 5 wt.%, of the combined weight of all initiators, based on the weight of the monomers to be polymerized, is used.

8. The process according to claim 1, wherein a blowing agent is added or dosed to the reaction mixture when the degree of polymerization of the monomer is less than 80.

9. The process according to claim 1, wherein the initiator, or mixture of initiators, is dosed in the form of a dispersion.

10. The process according to claim 1, wherein an additional initiator is used to reduce the residual monomer level.

11. The process according to claim 10, wherein the process produces expandable polystyrene.

12. The process according to claim 2, wherein the ethylenically unsaturated polymers are chosen from the group consisting of polybutadiene and styrene butadiene rubber.

13. The process according to claim 3, wherein said initiator is dosed continuously or semi-continuously from a point in time at which at least 0.5% of the monomer has already been polymerized until at least 80% of the monomer is polymerized.

14. The process according to claim 13, wherein said initiator is dosed continuously or semi-continuously from a point in time at which at least 1% of the monomer has already been polymerized until at least 90% of the monomer is polymerized.

15. The process according to claim 14, wherein said initiator is dosed continuously or semi-continuously from the point in time at which at least 0.1% of the monomer has already been polymerized until less than 1,000 ppm of monomer is present.

16. The process according to claim 5, wherein the reaction temperature is 150° C. or lower.

17. The process according to claim 16, wherein the reaction temperature is 130° C. or lower.

18. The process according to claim 17, wherein the reaction temperature is 120° C. or lower.

19. The process according to claim 6, wherein at least part of the initiator is continuously or semi-continuously dosed over a period of at least 1 hour.

20. The process according to claim 7, wherein at least at least 0.05 wt.%, of the combined weight of all initiators and at most 3 wt.% of the combined weight of all initiators, based on the weight of the monomers to be polymerized, is used.

21. The process according to claim 20, wherein at least at least 0.1 wt.% of the combined weight of all initiators and at most 1 wt.% of the combined weight of all initiators, based on the weight of the monomers to be polymerized, is used.

22. The process according to claim 8, wherein a blowing agent is added or dosed to the reaction mixture when the degree of polymerization of the monomer is less than 60%.

23. The process according to claim 22, wherein a blowing agent is added or dosed to the reaction mixture when the degree of polymerization of the monomer is less than 50%.

24. The process according to claim 9, wherein the initiator, or mixture of initiators, is dosed in the form of an aqueous dispersion.

25. The process according to claim 4, wherein the initiator is selected from the group consisting of dibenzoylperoxide, 1,1-di(tert-butylperoxy)-3,3,5-trimethylcyclohexane, 2,2'-azobis(isobutyronitrile), 2,2'-azobis(2-methylbutyronitrile), and mixtures thereof.

* * * * *